(12) United States Patent
Rao et al.

(10) Patent No.: US 7,009,500 B2
(45) Date of Patent: Mar. 7, 2006

(54) METHOD FOR OPERATING A PRE-CRASH SENSING SYSTEM IN A VEHICLE HAVING A COUNTERMEASURE SYSTEM USING STEREO CAMERAS

(75) Inventors: Manoharprasad K. Rao, Novi, MI (US); Kwaku O. Prakah-Asante, Commerce Township, MI (US); Gary Steven Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 472 days.

(21) Appl. No.: 09/683,782

(22) Filed: Feb. 13, 2002

(65) Prior Publication Data

US 2003/0154011 A1   Aug. 14, 2003

(51) Int. Cl.
*B60Q 1/00* (2006.01)
(52) U.S. Cl. .............. 340/435; 340/438; 340/903; 340/905; 701/301; 701/200; 701/45
(58) Field of Classification Search ............... 340/435, 340/436, 437, 438, 903, 904, 905; 701/301, 701/200, 45
See application file for complete search history.

(56) References Cited

U.S. PATENT DOCUMENTS

| | | |
|---|---|---|
| 3,514,610 A | 5/1970 | Huston et al. |
| 4,257,703 A | 3/1981 | Goodrich |
| 4,381,829 A | 5/1983 | Montaron |
| 4,623,966 A | 11/1986 | O'Sullivan |
| 4,638,289 A | 1/1987 | Zottnik |
| 4,673,937 A | 6/1987 | Davis |
| 4,833,469 A | 5/1989 | David |
| 4,916,450 A | 4/1990 | Davis |
| 4,969,103 A | 11/1990 | Maekawa |
| 4,992,943 A | 2/1991 | McCracken |
| 4,994,972 A | 2/1991 | Diller |
| 5,040,118 A | 8/1991 | Diller |
| 5,063,603 A | 11/1991 | Burt |
| 5,091,726 A | 2/1992 | Shyu |
| 5,162,794 A | 11/1992 | Seith |
| 5,166,881 A | 11/1992 | Akasu |
| 5,173,859 A | 12/1992 | Deering |
| 5,182,459 A | 1/1993 | Okano et al. |
| 5,230,400 A | 7/1993 | Kakinami et al. |
| 5,234,071 A | 8/1993 | Kajiwara |
| 5,249,157 A | 9/1993 | Taylor |
| 5,307,136 A | 4/1994 | Saniyoshi |
| 5,314,037 A | 5/1994 | Shaw et al. |
| 5,430,432 A | 7/1995 | Camhi et al. |
| 5,467,283 A | 11/1995 | Butsuen et al. |
| 5,479,173 A | 12/1995 | Yoshioka et al. |

(Continued)

FOREIGN PATENT DOCUMENTS

EP     0720928 A2    10/1996

(Continued)

*Primary Examiner*—Jeffery Hofsass
*Assistant Examiner*—Daniel Previl
(74) *Attorney, Agent, or Firm*—Frank A. MacKenzie

(57) ABSTRACT

A pre-crash sensing system is coupled to a countermeasure system that has at least a first countermeasure and a second countermeasure. The pre-crash sensing system has a vision system (26) that generates an object size signal and an object distance signal. A controller (12) is coupled to the vision system (26) and deploys either the first countermeasure or first and second countermeasures in response to the object distance and object size.

17 Claims, 5 Drawing Sheets

U.S. PATENT DOCUMENTS

| | | | |
|---|---|---|---|
| 5,502,432 | A | 3/1996 | Ohmamyuda et al. |
| 5,521,580 | A | 5/1996 | Kaneko et al. |
| 5,526,269 | A | 6/1996 | Ishibashi et al. |
| 5,534,870 | A | 7/1996 | Avignon et al. |
| 5,541,590 | A | 7/1996 | Nishio |
| 5,552,986 | A | 9/1996 | Omura et al. |
| 5,572,428 | A | 11/1996 | Ishida et al. |
| 5,574,463 | A | 11/1996 | Shirai et al. |
| 5,594,414 | A | 1/1997 | Namngani |
| 5,602,760 | A | 2/1997 | Chacon et al. |
| 5,604,683 | A | 2/1997 | Roecker |
| 5,629,847 | A | 5/1997 | Shirakawa et al. |
| 5,635,922 | A | 6/1997 | Cho et al. |
| 5,646,612 | A | 7/1997 | Byon |
| 5,680,097 | A | 10/1997 | Uemura et al. |
| 5,684,474 | A | 11/1997 | Gilon et al. |
| 5,689,264 | A | 11/1997 | Ishikawa et al. |
| 5,699,040 | A | 12/1997 | Matsuda |
| 5,699,057 | A | 12/1997 | Ikeda et al. |
| 5,710,565 | A | 1/1998 | Shirai et al. |
| 5,745,870 | A | 4/1998 | Yamamoto et al. |
| 5,748,477 | A | 5/1998 | Katoh |
| 5,749,426 | A | 5/1998 | Gilling |
| 5,751,211 | A | 5/1998 | Shirai et al. |
| 5,751,836 | A | 5/1998 | Wildes et al. |
| 5,754,099 | A | 5/1998 | Nishimura et al. |
| 5,771,481 | A | 6/1998 | Gilling |
| 5,779,264 | A | 7/1998 | Demesseman et al. |
| 5,785,347 | A * | 7/1998 | Adolph .................. 280/735 |
| 5,808,561 | A | 9/1998 | Kinoshita et al. |
| 5,815,093 | A | 9/1998 | Kikinis |
| 5,835,007 | A | 11/1998 | Kosiak |
| 5,835,873 | A | 11/1998 | Darby et al. |
| 5,838,228 | A | 11/1998 | Clark |
| 5,847,472 | A | 12/1998 | Byon |
| 5,847,755 | A | 12/1998 | Wixson et al. |
| 5,872,536 | A | 2/1999 | Lyons et al. |
| 5,905,457 | A | 5/1999 | Rashid |
| 5,906,393 | A | 5/1999 | Mazur et al. |
| 5,920,345 | A | 7/1999 | Sauer |
| 5,926,126 | A | 7/1999 | Engelman |
| 5,936,549 | A | 8/1999 | Tsuchiya |
| 5,938,714 | A | 8/1999 | Satonaka |
| 5,948,026 | A | 9/1999 | Beemer, II et al. |
| 5,949,366 | A | 9/1999 | Hermann |
| 5,949,918 | A | 9/1999 | McCaffrey |
| 5,955,967 | A | 9/1999 | Yamada |
| 5,959,552 | A * | 9/1999 | Cho ........................ 340/903 |
| 5,963,272 | A | 10/1999 | Wixson |
| 5,964,822 | A | 10/1999 | Alland et al. |
| 5,983,161 | A | 11/1999 | Lemelson et al. |
| 5,995,037 | A | 11/1999 | Matsuda et al. |
| 5,999,117 | A | 12/1999 | Engel |
| 5,999,874 | A | 12/1999 | Winner et al. |
| 6,002,983 | A | 12/1999 | Alland et al. |
| 6,018,308 | A * | 1/2000 | Shirai ........................ 701/301 |
| 6,025,797 | A | 2/2000 | Kawai et al. |
| 6,026,340 | A | 2/2000 | Corrado et al. |
| 6,031,484 | A | 2/2000 | Bullinger et al. |
| 6,037,860 | A | 3/2000 | Zander et al. |
| 6,044,166 | A | 3/2000 | Bassman et al. |
| 6,044,321 | A | 3/2000 | Nakamura et al. |
| 6,049,619 | A | 4/2000 | Anandan et al. |
| 6,061,105 | A | 5/2000 | Sugimoto |
| 6,076,028 | A | 6/2000 | Donnelly et al. |
| 6,084,508 | A | 7/2000 | Mai et al. |
| 6,085,151 | A | 7/2000 | Farmer et al. |
| 6,087,928 | A | 7/2000 | Kleinberg et al. |
| 6,088,639 | A | 7/2000 | Fayyad et al. |
| 6,094,159 | A | 7/2000 | Osterfeld et al. |
| 6,097,332 | A | 8/2000 | Crosby, II |
| 6,114,951 | A * | 9/2000 | Kinoshita et al. ........... 340/436 |
| 6,121,896 | A | 9/2000 | Rahman |
| 6,148,943 | A | 11/2000 | Kodaka et al. |
| 6,151,539 | A | 11/2000 | Bergholz et al. |
| 6,157,892 | A | 12/2000 | Hada et al. |
| 6,161,074 | A | 12/2000 | Sielagoski et al. |
| 6,168,198 | B1 | 1/2001 | Breed et al. |
| 6,169,479 | B1 | 1/2001 | Boran et al. |
| 6,177,866 | B1 | 1/2001 | O'Connell |
| 6,185,490 | B1 | 2/2001 | Ferguson |
| 6,186,539 | B1 | 2/2001 | Foo et al. |
| 6,188,316 | B1 | 2/2001 | Matsuno et al. |
| 6,191,704 | B1 | 2/2001 | Takenaga et al. |
| 6,204,756 | B1 | 3/2001 | Senyk et al. |
| 6,209,909 | B1 | 4/2001 | Breed |
| 6,218,960 | B1 | 4/2001 | Ishikawa et al. |
| 6,219,606 | B1 | 4/2001 | Wessels et al. |
| 6,223,125 | B1 | 4/2001 | Hall |
| 6,225,918 | B1 | 5/2001 | Kam |
| 6,226,389 | B1 | 5/2001 | Lemelson et al. |
| 6,229,438 | B1 | 5/2001 | Kutlucinar et al. |
| 6,246,961 | B1 | 6/2001 | Sasaki et al. |
| 6,249,738 | B1 | 6/2001 | Higashimata et al. |
| 6,256,584 | B1 | 7/2001 | Kodaka et al. |
| 6,259,992 | B1 | 7/2001 | Urai et al. |
| 6,442,484 | B1 * | 8/2002 | Miller et al. ................. 340/990 |
| 6,480,102 | B1 * | 11/2002 | Miller et al. ................. 340/436 |
| 2003/0139881 | A1 * | 7/2003 | Miller et al. ................. 701/301 |

FOREIGN PATENT DOCUMENTS

| | | |
|---|---|---|
| JP | 54-65934 A | 5/1979 |
| WO | WO 98/37435 | 8/1998 |
| WO | WO 98/58274 | 12/1998 |

* cited by examiner

METHOD FOR OPERATING A PRE-CRASH SENSING SYSTEM IN A VEHICLE HAVING A COUNTERMEASURE SYSTEM USING STEREO CAMERAS

CROSS REFERENCE TO RELATED APPLICATIONS

The present invention is related to U.S. Applications Ser. No. 09/683,774 entitled "Method For Operating A Pre-Crash Sensing System In A Vehicle Having A Countermeasure System" and Ser. No. 09/683,779 entitled "Method For Operating A Pre-Crash Sensing System In A Vehicle Having A Countermeasure System Using A Radar and Camera" filed simultaneously herewith and hereby incorporated by reference.

BACKGROUND OF INVENTION

1. Technical Field

The present invention relates to pre-crash sensing systems for automotive vehicles, and more particularly, to pre-crash sensing systems having countermeasures operated in response to pre-crash detection.

2. Background

Auto manufacturers are investigating radar, lidar, and vision-based pre-crash sensing systems to improve occupant safety. Current vehicles typically employ accelerometers that measure decelerations acting on the vehicle body in the event of a crash. In response to accelerometers, airbags or other safety devices are deployed.

In certain crash situations it would be desirable to provide information before forces actually act upon the vehicle when a collision is unavoidable.

Remote sensing systems using radar, lidar or vision based technologies for adaptive cruise control, collision avoidance and collision warning applications are known. These systems have characteristic requirements for false alarms. Generally, the remote sensing system reliability requirements for pre-crash sensing for automotive safety related systems are more stringent than those for comfort and convenience features, such as, adaptive cruise control. The reliability requirements even for safety related features vary significantly, depending upon the safety countermeasure under consideration. For example, tolerance towards undesirable activations may be higher for activating motorized belt pre-tensioners than for functions such as vehicle suspension height adjustments. Non-reversible safety countermeasures, including airbags, require extremely reliable sensing systems for pre-crash activation. However, the size of objects is typically not taken into consideration in the activation of such countermeasure devices. Also, such systems may generate unintentional or undesirable activations when the host vehicle is maneuvering at high speeds, low speeds, or when traveling on a sharp curved road. When a vehicle is traveling on a curved road, for example, objects outside of the lane of travel may be determined to be potential crash objects.

It would therefore be desirable to provide a pre-crash sensing system that reduces unintentional or undesirable activations.

It would also be desirable to provide a system that takes into consideration the size of the object detected.

SUMMARY OF INVENTION

The present invention provides an improved pre-crash sensing system that reduces false activations and activates a countermeasure in response to the size of the object detected.

In one aspect of the invention, a method for operating a pre-crash sensing system for an automotive vehicle having a countermeasure system comprises:
  establishing a decision zone relative to the vehicle;
  detecting an object within the decision zone using a vision system;
  determining an object distance and relative velocity using a vision system;
  determining an object size; and
  activating the countermeasure system in response to the object size and relative velocity.

In a further aspect of the invention, a method for operating a control system comprises: establishing a decision zone relative to the vehicle; detecting an object within the decision zone; determining an object distance and relative velocity; determining an object size; and activating the countermeasure system in response to the object size and relative velocity.

One advantage of the invention is that the size and orientation of the object may be taken into consideration. This is extremely useful if the object is another automotive vehicle such as a sport utility, car or truck. By knowing the size of the vehicle, different countermeasures and different countermeasure activation modes may be chosen.

Another advantage of the invention is that unintentional or inadvertent activation of countermeasure devices is minimized.

Other advantages and features of the present invention will become apparent when viewed in light of the detailed description of the preferred embodiment when taken in conjunction with the attached drawings and appended claims.

DETAILED DESCRIPTION

Figure 1:
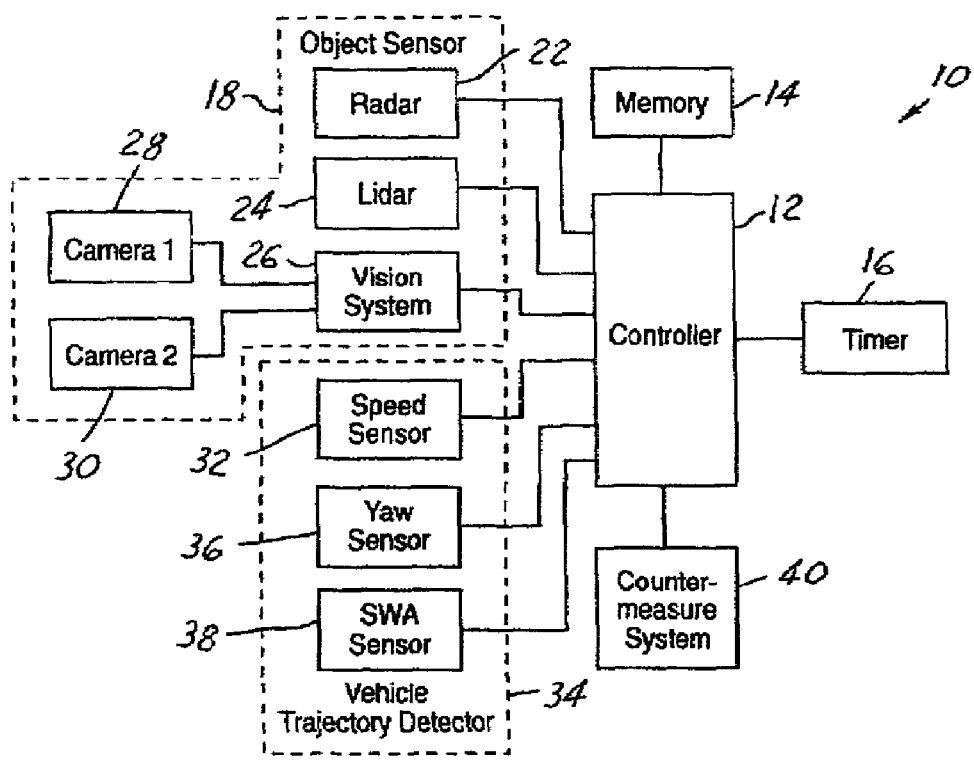
FIG. 1 is a block diagrammatic view of a pre-crash sensing system according to the present invention.

In the following figures the same reference numerals will be used to identify the same components. While the present invention is illustrated with respect to several types of object sensors, various types and combinations of object sensors may be used as will be further described below.

Referring now to FIG. 1, a pre-crash system 10 has a controller 12. Controller 12 is preferably a microprocessor-based controller that is coupled to a memory 14 and a timer 16. Memory 14 and timer 16 are illustrated as separate components from that of controller 12. However, those skilled in the art will recognize that memory 14 and timer 16 may be incorporated into controller 12.

Memory 14 may comprise various types of memory including read only memory, random access memory, electrically erasable programmable read only memory, and keep alive memory. Memory 14 is used to store various thresholds and parameters as will be further described below.

Timer 16 is a timer such as a clock timer of a central processing unit within controller 12. Timer 16 is capable of timing the duration of various events as well as counting up or counting down.

A remote object sensor 18 is coupled to controller 12. Remote object sensor 18 generates an object signal in the presence of an object within its field of view. Remote object sensor 18 may be comprised of one or a number of types of sensors including a radar 22, a lidar 24, and a vision system 26. Vision system 26 may be comprised of one or more cameras, CCD or CMOS type devices. As illustrated, a first camera 28 and a second camera 30 may form vision system 26. Both radar 22 and lidar 24 are capable of sensing the presence and the distance of an object from the vehicle. When used as a stereo pair, cameras 28 and 30 acting together are also capable of detecting the distance of an object from the vehicle. Alternately, as will be further described below, radar 22 or lidar 24 may be used to detect an object within a detection zone and vision system 26 may be used to confirm the presence of the object within the decision zone and to provide the size of the object to controller 12. In another embodiment of the invention cameras 1 and 2 alone may use established triangulation techniques to determine the presence of an object and the distance from the vehicle as well as the object's size which may include area, height or width, or combinations thereof. In the case of vision systems, the object relative velocity information can be obtained from numerical differentiation techniques.

A speed sensor 32 is also coupled to controller 12. Speed sensor 32 may be one of a variety of speed sensors known to those skilled in the art. For example, a suitable speed sensor may include a sensor at every wheel that is averaged by controller 12. Preferably, controller translates the wheel speeds into the speed of the vehicle. Suitable type of speed sensors 32 may include, for example, toothed wheel sensors such as those employed on anti-lock brake systems.

A vehicle trajectory detector 34 is also coupled to controller 12. The vehicle trajectory detector 34 generates a signal indicative of the vehicle traveling on a curved road. The vehicle trajectory detector 34 may comprise various numbers or combinations of sensors but preferably include a yaw rate sensor 36, vehicle speed sensor 32 and a steering wheel angle sensor 38. Yaw rate sensor 36 preferably provides the yaw rate of the vehicle about the center of gravity of the vehicle. The yaw rate measures the rotational tendency of the vehicle about an axis normal to the surface of the road. Although yaw rate sensor is preferably located at the center of gravity, those skilled in the art will recognize that the yaw rate sensor may be located in various locations of the vehicle and translated back to the center of gravity either through calculations at the yaw rate sensor 36 or through calculations within controller 12 in a known manner.

Steering wheel angle sensor 38 provides a steering wheel angle signal to controller 12. The steering wheel angle signal corresponds to the steering wheel angle of the hand wheel of the automotive vehicle. As will be further set forth below, the yaw rate sensor 36 and the vehicle speed sensor 32 or the steering wheel angle sensor 38 alone, or the above sensors in combination, may be used to indicate a curved road.

Controller 12 is used to control the activation of a countermeasure system 40. Each countermeasure may have an individual actuator associated therewith. In that case, controller 12 may direct the individual countermeasure actuator to activate the countermeasure. Various types of countermeasure systems will be evident to those skilled in the art. Examples of a countermeasure within a countermeasure system include occupant belt pretensioning, bumper height changing, braking, the pre-arming of internal airbags, the deployment of external or internal airbags, pedal control, steering column position, head restraint and knee bolster control. Preferably, controller 12 is programmed to activate the appropriate countermeasure in response to the inputs from the various sensors. As will be described below, the controller may choose the countermeasure based on the type and orientation of the target vehicle.

Figure 2:
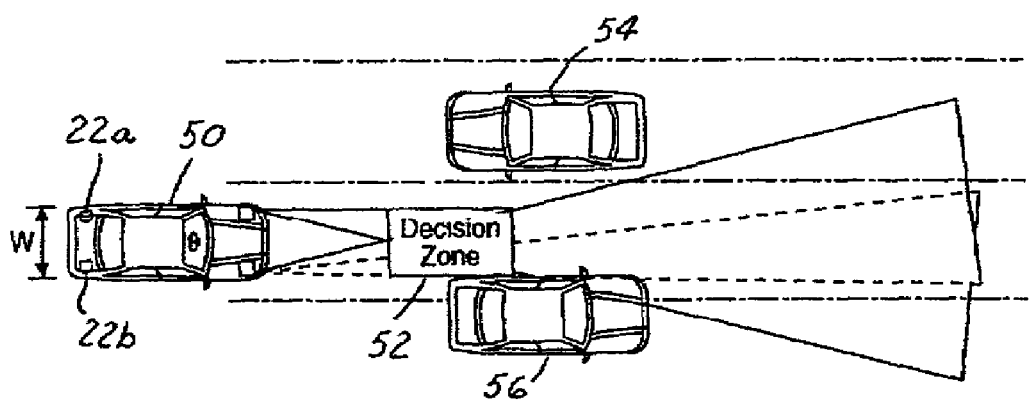
FIG. 2 is a top view of an automotive vehicle with the radar part of a pre-crash sensing system that includes two narrow beam radar sensors.

Referring now to FIG. 2, a vehicle 50 is illustrated having a decision zone in front thereof. The width of the decision zone is a predetermined quantity depending upon the width of the host vehicle. The longitudinal dimensions of the danger zone depend upon the relative velocity coverage requirements and the vision system coverage capabilities. An oncoming vehicle 54 is illustrated as well as an ongoing vehicle 56 traveling in the same direction as vehicle 50. The vision system covers the entire decision zone 52. As can be seen, a first radar 22A and a second radar 22B are used to direct signals through decision zone 52. When an object enters the decision zone, the radar sensors are able to detect its presence and also obtain its relative velocity with respect to the host vehicle. When the object enters the decision zone the present invention is activated.

Figure 3:
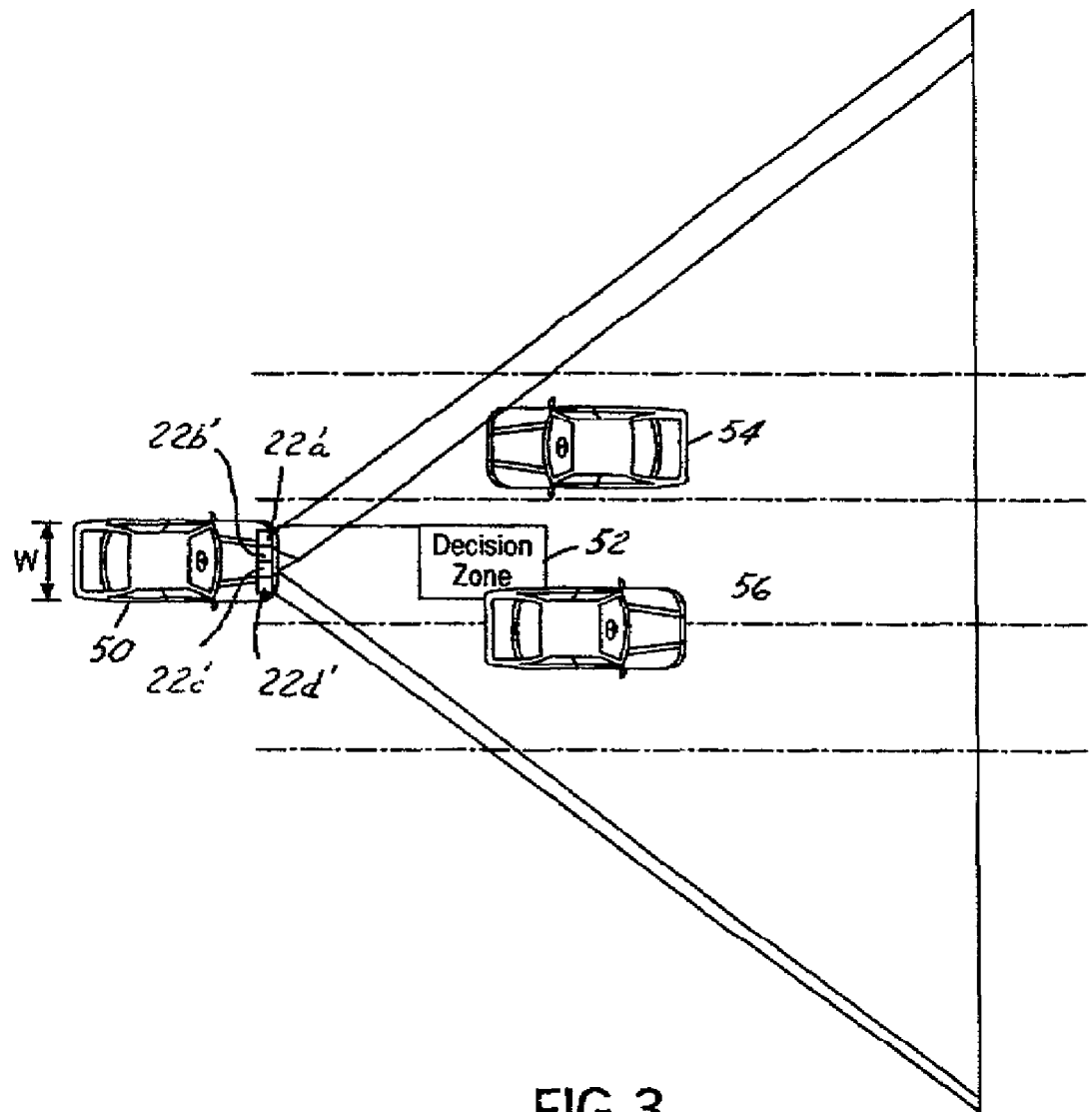
FIG. 3 is a top view of an automotive vehicle with the radar part of a pre-crash sensing system according to the present invention that employs four wide beam radar sensors.

Referring now to FIG. 3, a similar view to that shown as in FIG. 2 is illustrated. In this embodiment, four wide beam radar sensors 22a", 22", b22c", and 22d" are used. With this multiple wide beam radar sensor arrangement, using established triangulation techniques, it is possible to obtain distance, bearing and relative velocity information of objects entering the decision zone. The same size and position of vehicles 54 and 56 are illustrated.

Figure 4:
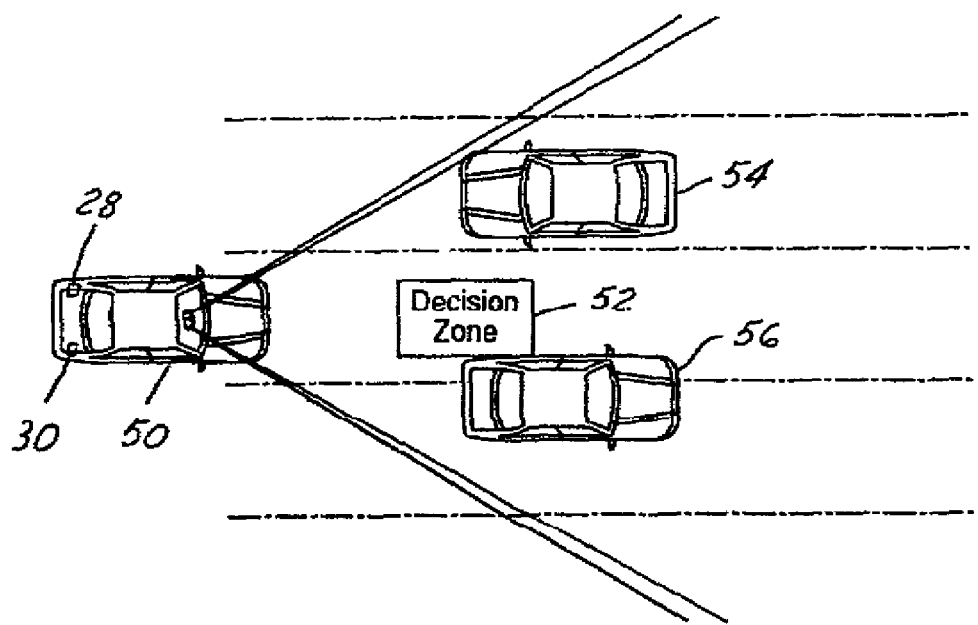
FIG. 4 is a top view of an automotive vehicle having a stereo pair of cameras 28, 30 mounted behind the rear view mirror.

Referring now to FIG. 4, a stereo pair of cameras 28, 30 are used on vehicle 50. By using a stereo pair of cameras, the presence, size and distance of the object from the vehicle may be determined. The object relative velocity information can be obtained from the numerical differentiation of the object position information.

Figure 5:
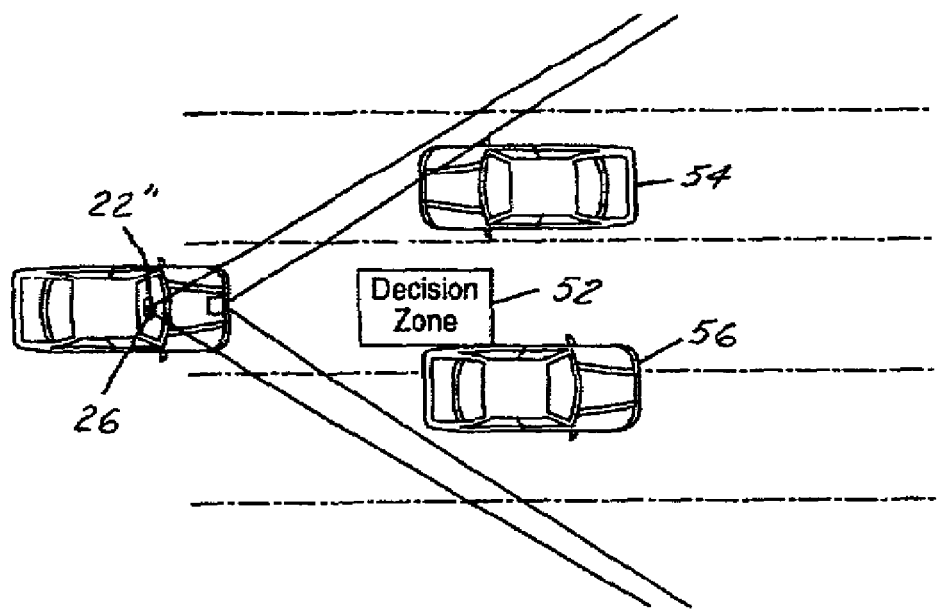
FIG. 5 is a top view of an automotive vehicle having another alternative object sensor 18 including a radar 22"" and vision system 26"".

Referring now to FIG. 5, a vehicle 50 pre-crash sensing system shows a scanning radar or lidar 22"" in combination with a vision system 26". Radar 22" can thus detect the presence of an object within decision zone, while camera 26"" can classify the object and verify the size and/or orientation of the object.

Figure 6:
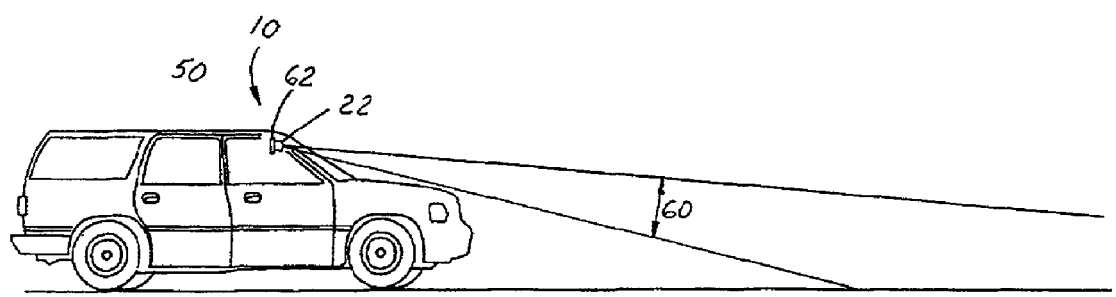
FIG. 6 is a side view of an automotive vehicle indicating the vision sensors line of sight in front of the vehicle.

Referring now to FIG. 6, automotive vehicle 50 is illustrated having a vision system 26 mounted at the back of a rear view mirror 62. A typical line of sight of the vision system, which defines the near side of the vehicle longitudinal decision zone in FIGS. 2 through 5 is shown. Radar sensors are typically mounted in front of the vehicle, behind the front grill or behind the front bumper fascia and have fields of coverage, which are unrestricted by the host vehicle's front end.

Figure 7:
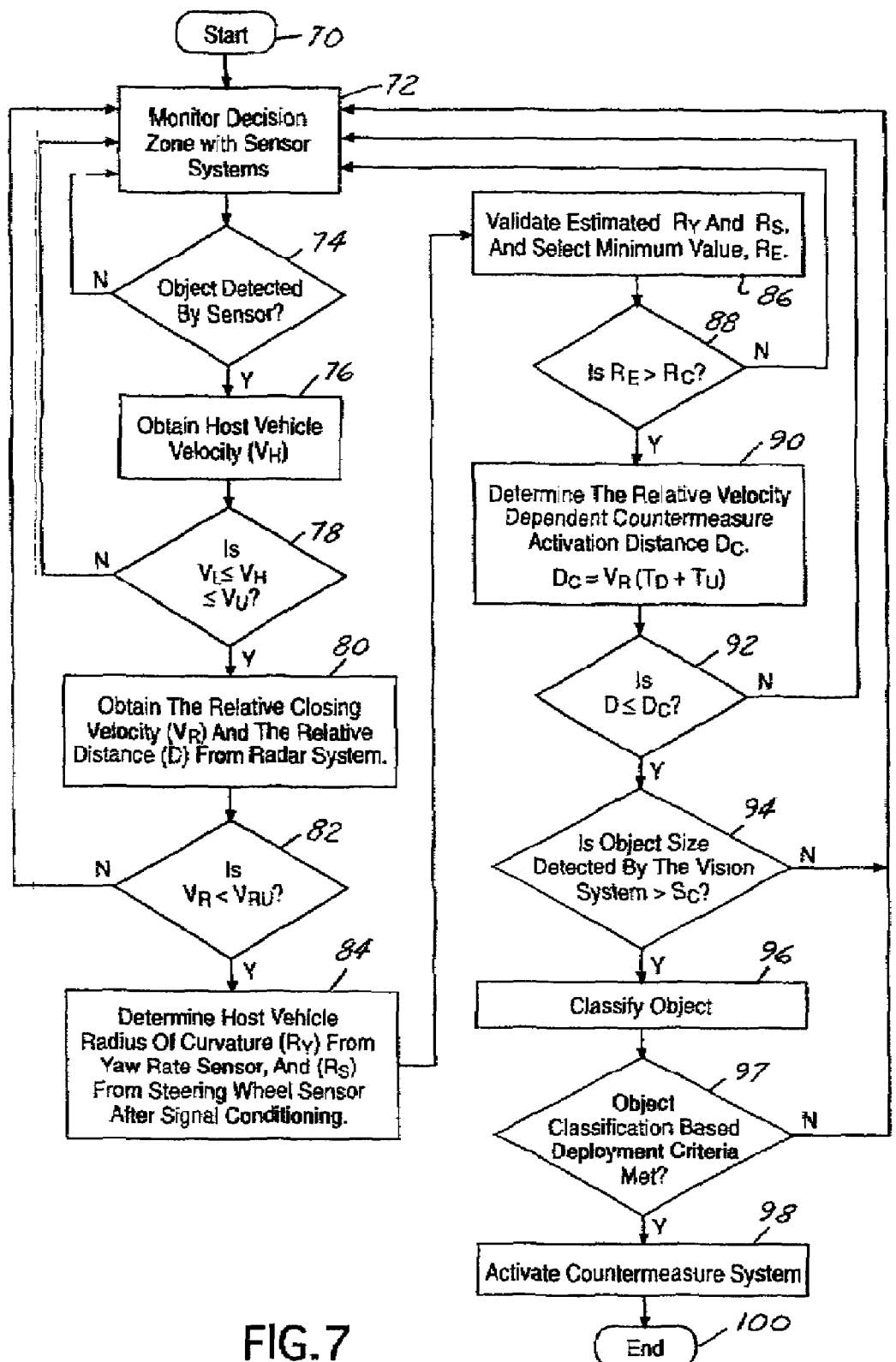
FIG. 7 is a flow chart of a method for operating the pre-crash sensing system according to the present invention.

Referring now to FIG. 7, a method according to the present invention starts at step 70. In step 72, the decision zone in front of the vehicle is monitored with the remote object detector. In the present example, the decision zone is monitored with a vision system that includes a stereo pair of cameras. In step 72 the vision system is used to first detect an object within the decision zone. If an object has not been detected in decision zone, step 72 is again executed. If an object has been detected by the vision system, step 76 is executed. In step 76, the host vehicle velocity ($V_H$) is determined. In this example the host vehicle is vehicle 50 described above. In step 78, a low speed threshold value $V_L$ and a high speed threshold value $V_U$ are established. In step 78 the host vehicle velocity (i.e. speed) ($V_H$) is compared with a first threshold ($V_L$) and a second threshold ($V_U$). The first threshold is a low speed threshold and the second threshold is a high speed threshold. In the present example, the low speed threshold is set at 24 kph (kilometers per hour) and the high speed threshold is set at 80 kph. Thus, if the host vehicle speed is less than the low speed threshold or greater than the high speed threshold, step 72 is again executed. If the host vehicle speed is between the low speed threshold and the high speed threshold, then step 80 is executed. Step 78 helps minimize inadvertent, unintentional and non-useful deployments during real world driving situations.

In step 80 the relative velocity ($V_R$) and the distance D from the vision system are determined for the closing object. In step 82 a relative velocity threshold value $V_{RU}$ is established. For example, for a $V_{RU}$ value of 80 kph, if the closing velocity ($V_R$) is not less than 80 kph, then step 72 is again executed. In step 82 if the closing velocity ($V_R$) is less than $V_{RU}$ (80 kph), step 84 determines the host vehicle trajectory radius of curvature ($R_Y$) from the yaw rate sensor, vehicle speed sensor, and the host vehicle trajectory radius of curvature ($R_S$) from the steering wheel sensor after appropriate signal conditioning as will be evident to those skilled in the art. In step 86, the radii of curvature from the yaw rate ($R_Y$) and from the steering wheel sensor ($R_S$) are validated to ensure they are within a proper range and are not erroneous readings. One method for validation is to compare previous values for the radius of curvature to determine if a value has changed at a rate greater than that physically achievable by the automotive vehicle. A minimum value is selected between the radius of curvature from the yaw rate and from the steering wheel sensor. This minimum value is the estimated radius of curvature ($R_E$).

In step 88, a radius of curvature threshold value ($R_C$) is established. The estimated radius of curvature ($R_E$) is compared with the threshold. If the estimated value is not greater than the threshold then step 72 is again executed. If the estimated radius of curvature value ($R_E$) is greater than the radius of curvature threshold, then step 90 is executed. Step 88 prevents the system from operating when the vehicle is traveling on a very curved trajectory to prevent an unintentional deployment.

In step 90, the relative velocity dependent countermeasure activation distance ($D_C$) is determined as a function of the closing relative velocity, a device deployment time dependent variable ($T_D$), and an update rate ($T_U$) of the sensing system. That is, $D_C=V_R(T_D+T_U)$. In step 92, if the relative distance D from the host vehicle is not less than or equal to the countermeasure activation distance ($D_C$) step 72 is again executed. If the relative distance D is less than or equal to countermeasure activation distance ($D_C$), step 94 is executed. In step 94 object size threshold ($S_C$) is established. In step 94 the object size is compared with an object size threshold ($S_C$). If the object size is not greater than the size threshold ($S_C$) then step 72 is executed. If the object size is greater than the threshold, step 96 is executed. In step 94 object size may correspond to various characteristics of the object. For example, the object height may be determined. The object width may also be determined. By knowing both the object width and object height, the object area may also be determined. When viewing object height, the difference between a small sports car, a full size sedan, a sport utility or light truck, and a heavy duty truck may be distinguished.

In step 96, the object may be classified. The object may be classified into various classes depending on the object size and other characteristics as set forth in step 94. Also, the size of the object may be classified for orientation. The orientation may ultimately lead to a different decision as to which of the countermeasures may be activated and may also define the mode of activation of the selected countermeasures. By looking at the object area or the object height and width as a function of time, a front view of a sport utility vehicle or a car may be distinguished from the side view.

In step 97, object size and orientation information is compared to object classification based deployment criteria for the elements of the countermeasure system. If the classification based deployment criteria are not satisfied then step 72 is again executed.

In step 98, when the classification based activation criteria are met, appropriate elements of the countermeasure system are activated in response to the various inputs described above. In step 100, the method ends after deployment.

While particular embodiments of the invention have been shown and described, numerous variations and alternate embodiments will occur to those skilled in the art. Accordingly, it is intended that the invention be limited only in terms of the appended claims.

What is claimed is:

1. A pre-crash sensing system coupled to a countermeasure system having at least a first countermeasure and a second countermeasure comprising:
   a vision system generating an object size signal and an object distance signal; and
   a controller coupled to said vision system for deploying either said first countermeasure or said first and second countermeasures in response to said object distance signal and said object size signal.

2. A system as recited in claim 1 wherein said vision system comprise a stereo pair of cameras.

3. A system as recited in claim 1 wherein said object size comprises height.

4. A system as recited in claim 1 wherein said object size comprises object area and object height.

5. A system as recited in claim 1 further comprising a vehicle speed sensor generating a speed signal corresponding to the longitudinal speed of the vehicle; wherein said controller activates said countermeasure system in response to the longitudinal speed signal.

6. A system as recited in claim 1 further comprising a decision zone; wherein said vision sensor detects an object and generates an object distance signal from an object within said decision zone.

7. A method for operating a pre-crash sensing system for an automotive vehicle having a countermeasure system, said method comprising:
   establishing a decision zone relative to the vehicle;

detecting an object within the decision zone using a vision system;

determining an object distance and relative velocity using a vision system;

determining an object size; and activating the countermeasure system in response to the object size and relative velocity.

8. A method as recited in claim 7 wherein determining object size comprises determining an object height; wherein activating the countermeasure system in response to the object size comprises activating the countermeasure system in response to the object height.

9. A method as recited in claim 7 wherein determining an object size comprises determining an object cross-sectional area; wherein activating the countermeasure system in response to the object size comprises activating the countermeasure system in response to the object cross-sectional area.

10. A method as recited in claim 7 wherein determining an object size comprises determining an object cross-sectional area and object height; wherein activating the countermeasure system in response to the object size comprises activating the countermeasure system in response to the object cross-sectional and object height.

11. A method as recited in claim 10 wherein determining an object cross-sectional area comprises determining the object cross-sectional area with a vision system.

12. A method as recited in claim 7 wherein detecting an object within the decision zone comprises detecting the object within the decision zone with a stereo pair of cameras.

13. A method as recited in claim 7 wherein prior to the step of activating, choosing the first countermeasure or the first countermeasure and the second countermeasure in response to said object size.

14. A method as recited in claim 7 wherein determining an object size comprises determining the vehicle orientation; wherein activating the countermeasure system in response to the object size comprises activating the countermeasure system in response to the object size and vehicle orientation.

15. A method as recited in claim 7 further comprising establishing a decision zone in front of the vehicle.

16. A method as recited in claim 15 further comprising detecting an object within the decision zone; and activating the countermeasure in response to detecting an object within the decision zone.

17. A method as recited in claim 7 wherein activating the countermeasure system comprises activating a first countermeasure comprising pre-arming airbags and pretensioning motorized belt pretensioners, or activating the first countermeasure and a second countermeasure wherein said second countermeasure comprises adjusting the host vehicle suspension height in response to object size and orientation.

* * * * *